United States Patent [19]

Goss et al.

[11] Patent Number: 4,669,882

[45] Date of Patent: Jun. 2, 1987

[54] LASER PULSE DETECTION METHOD AND APPARATUS

[75] Inventors: Willis C. Goss, Altadena; James R. Janesick, LaCanada, both of Calif.

[73] Assignee: The United States of America as represented by the Administrator of the National Aeronautics and Space Administration, Washington, D.C.

[21] Appl. No.: 582,494

[22] Filed: Feb. 22, 1984

[51] Int. Cl.$^4$ ............................................. G01C 19/64
[52] U.S. Cl. .................................................... 356/350
[58] Field of Search ......................... 356/350; 372/94; 357/24 RL

[56] References Cited

U.S. PATENT DOCUMENTS

| | | | |
|---|---|---|---|
| 3,751,166 | 8/1973 | Starkey et al. | 356/5 |
| 3,931,463 | 1/1976 | Levine | 356/24 LR |
| 4,134,677 | 1/1979 | Ling et al. | 356/5 |
| 4,197,469 | 4/1980 | Cheung | 357/24 LR |
| 4,259,592 | 3/1981 | Frungel et al. | 250/574 |

FOREIGN PATENT DOCUMENTS 3001721  7/1981  Fed. Rep. of Germany ...... 356/350

OTHER PUBLICATIONS

"Limitation of Rotation Sensing by Scattering", Cutler et al., Optical Society of America, 11-1980, pp. 488-490.

"Mosaic Image Sensor Cell", Will, IBM Technical Disclosure Bulletin, S-1969, p. 1618.

W. C. Goss et al., "Fiber-Optic Rotation Sensor Technology", *Applied Optics*, vol. 19, No. 6 (1980).

*Primary Examiner*—Davis L. Willis
*Assistant Examiner*—S. A. Turner
*Attorney, Agent, or Firm*—Paul F. McCaul; John R. Manning; Thomas H. Jones

[57] ABSTRACT

A sensor is described for detecting the difference in phase of a pair of returned light pulse components, such as the two components of a light pulse of an optical gyro. In an optic gyro, the two light components have passed in opposite directions through a coil of optical fiber, with the difference in phase of the returned light components determining the intensity of light shining on the sensor. The sensor includes a CCD (charge coupled device) that receives the pair of returned light components to generate a charge proportional to the number of photons in the received light. The amount of the charge represents the phase difference between the two light components. At a time after the transmission of the light pulse and before the expected time of arrival of the interfering light components, charge accumulating in the CCD as a result of reflections from optical components in the system, are repeatedly removed from the CCD, by transferring out charges in the CCD and dumping these charges.

6 Claims, 6 Drawing Figures

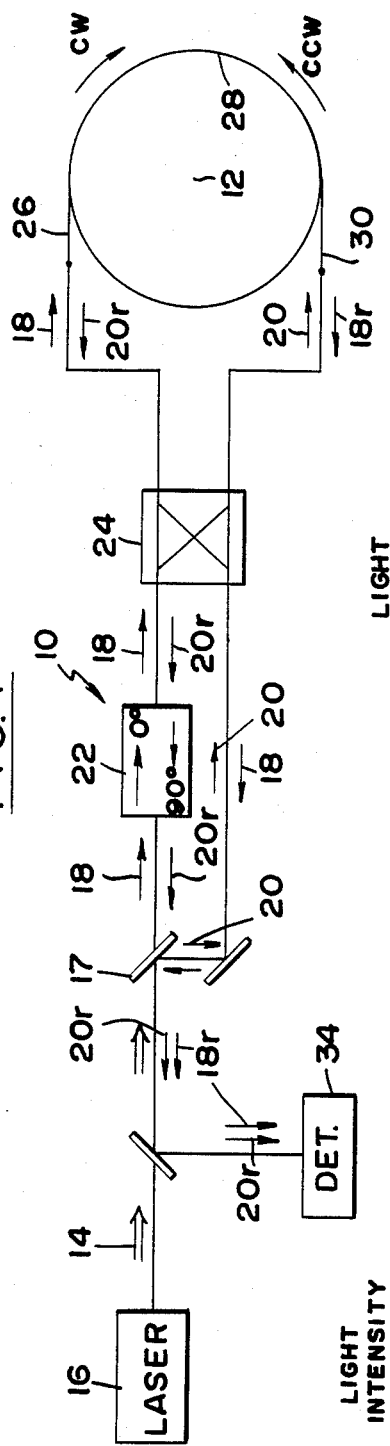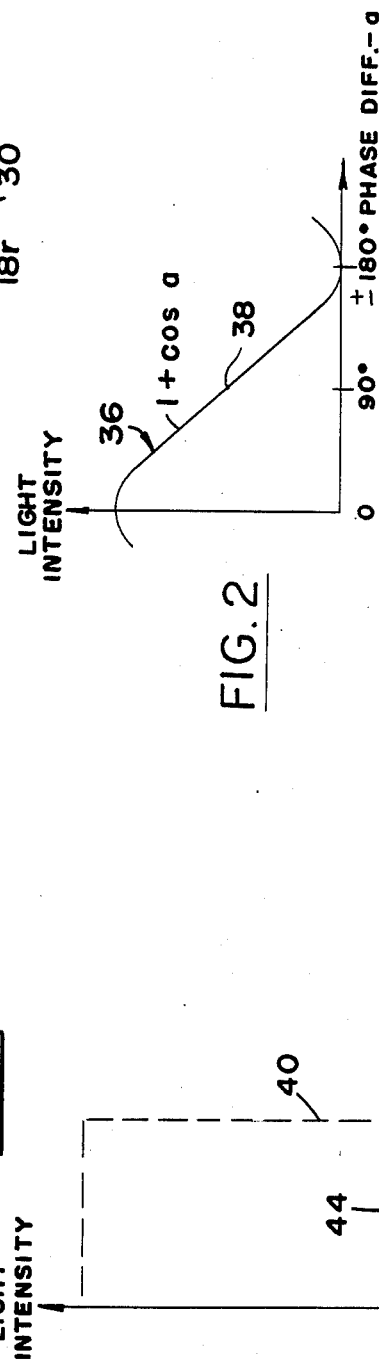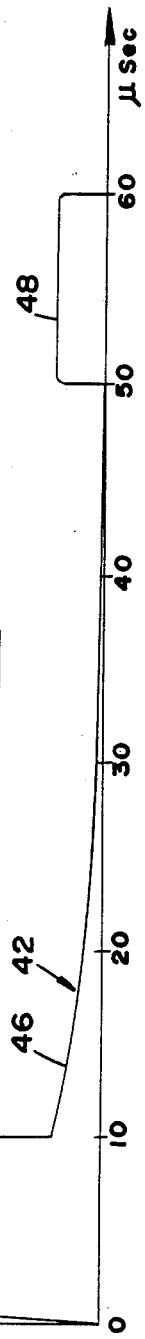
FIG. 1
FIG. 2
FIG. 3

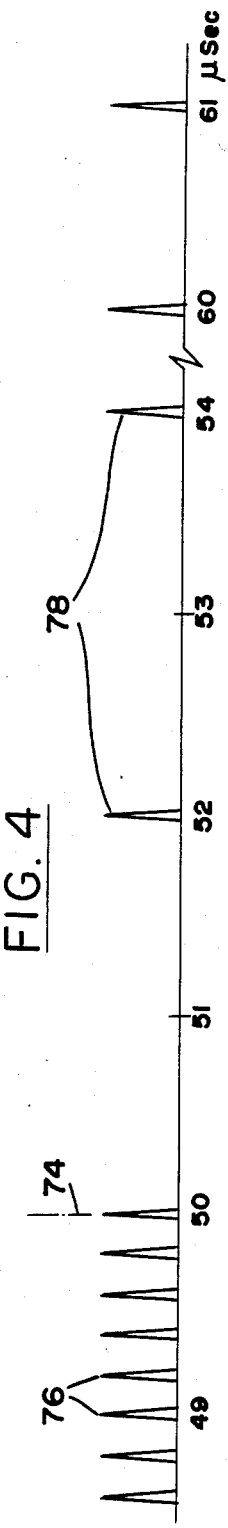
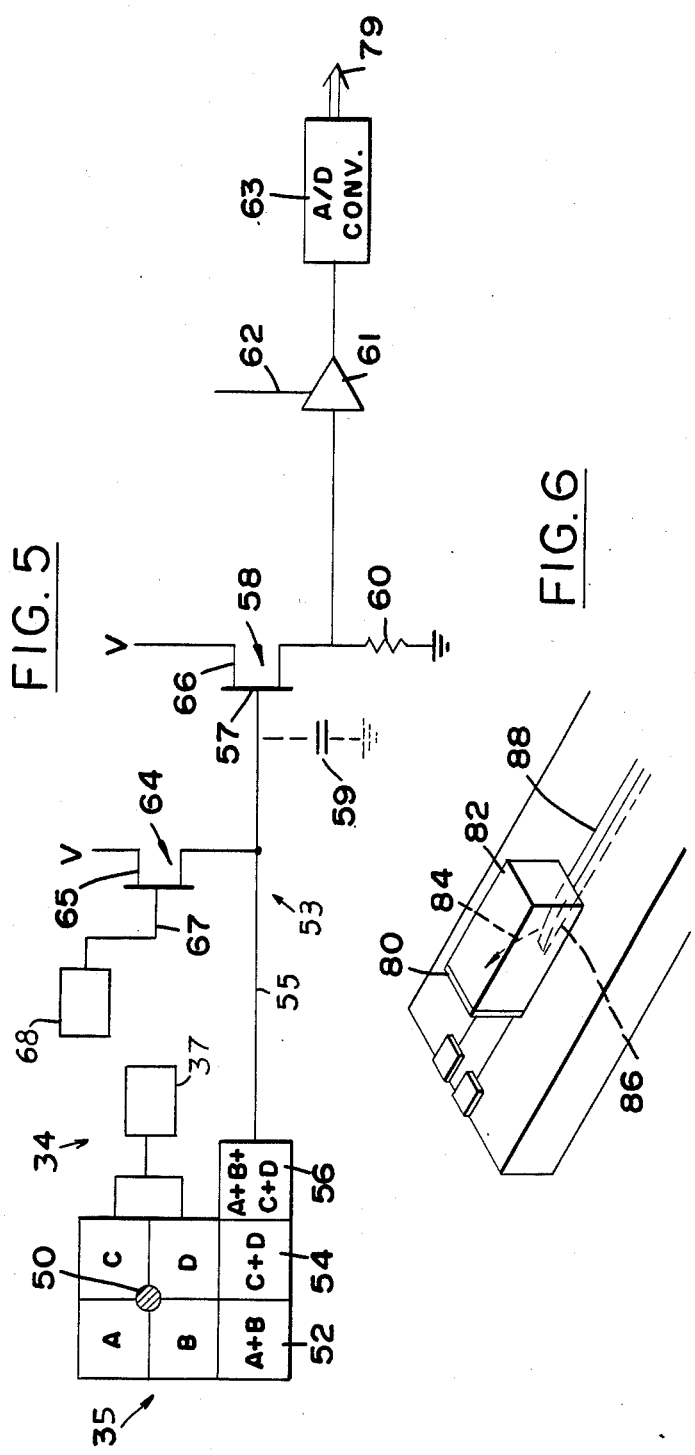
FIG. 4
FIG. 5
FIG. 6

LASER PULSE DETECTION METHOD AND APPARATUS

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

One type of optical gyroscope, described in U.S. Pat. No. 4,280,766 by Willis C. Goss et al. transmits a laser light pulse, splits the pulse into two components, and passes the two components in opposite directions through a coil of optical fiber of a considerable length such as 10 kilometers. The two light pulse components that exit from the coil are directed onto a photodetector to detect the difference in their phase. If the coil is turning, the light component moving in the direction of rotation will arrive at the detector later than the light component moving opposite to the direction of rotation, and therefore the two components will be out of phase. The greater the phase difference (up to 180°) the lower the amount of light shining on the detector. In order to detect rotation with high sensitivity and accuracy, the amount of light incident on the detector must be detected with great accuracy.

A major difficulty which arises in the accurate detection of light falling on the photodetector is the large amounts of light that are received which do not represent the returned light components. A major source of such "noise" arises as reflections from optical components lying between the laser and the coil of optical fiber, such as at the surfaces of beam splitters and other optical components. These reflections are received only a very short time after the transmission of the laser pulse. Another source of noise is backscatter from the optic fiber, which decreases exponentially until it is at a very low level immediately before the detection of the pulse components.

Several types of devices can be used to detect the light components, but not the reflections and backscatter light, by turning on the detector just before the light components are expected to be received. One type of detector is a silicon or germanium photodetector which can be switched on just before the returned components are expected. However, the switching on of a silicon or germanium photodetector results in the creation of electrical noise which adds an unpredicable amount to the electrical charge generated by the detection of light from the interfering components. An image intensifier tube could be gated on just prior to the expected time of return of the light pulse components, and its output delivered to a silicon or germanium photodetector to increase the signal to noise ratio. However, the gain of available image intensifiers is not highly stable, and typically only 15% of the photons reaching such an intensifier tube result in the generation of an electron so the tubes are fairly noisy. Also, such tubes and their power supplies are typically bulky and expensive.

SUMMARY OF THE INVENTION

In accordance with one embodiment of the present invention, an apparatus is provided for detecting a light pulse that is expected to be received at a predetermined time without detection of spurious light received prior to the predetermined time, wherein the apparatus is very sensitive and precise and is minimally affected by light received prior to the predetermined time. The apparatus includes a CCD (charge coupled device) which is positioned to receive the light pulse, and a circuit which transfers out and dumps noise-caused charge accumulating in the CCD prior to the time of arrival of the light pulse to be detected. At the expected time of arrival, charges are allowed to accumulate in the CCD, and at the end of the expected period of the received light pulse, the accumulated charge is transferred out of the CCD. A signal is generated which represents the amount of charge that has just been transferred out of the CCD. In one system, the transfer out and dumping of charge from the CCD prior to the expected time of arrival of the light pulse to be detected, occurs many times.

The novel features of the invention are set forth with particularity in the appended claims. The invention will be best understood from the following description when read in conjunction with the accompanying drawings.

BRIEF DESCRIPTION OF THE DRAWINGS

FIG. 1 is a block diagram view of one form of optic gyroscope which uses the present invention.

FIG. 2 is a graph showing variation in light intensity with phase difference of a pair of light pulse components.

FIG. 3 is a graph showing the variation in intensity of light with time, of light that is incident on the detector of the present invention.

FIG. 4 is a graph showing the rate of transfer out of charge from the detector of FIG. 1.

FIG. 5 is a diagram of a detector circuit constructed in accordance with one embodiment of the invention.

FIG. 6 is a partial perspective view of a detector circuit constructed in accordance with another embodiment of the invention.

DESCRIPTION OF THE PREFERRED EMBODIMENTS

FIG. 1 is a simplified view of an optic gyro 10, for measuring rotation of the gyro about an axis 12 (or any axis parallel thereto). A pulse of light indicated at 14, is transmitted from a laser 16 and is split by a beam splitter 17 into two components 18, 20. The component 18 passes through a bias cell 22 and a modulator 24, to pass into one end 26 of a coil of optic fiber 28. The other light pulse component 20 passes through the modulator 24 to enter an opposite end 30 of the coil. The first component 18 passes in a clockwise direction, indicated by arrow CW, around the coil, while the other component 20 passes in the counterclockwise direction, indicated by arrow CCW, around the coil. For a coil having a length of 10 kilometers, the components exit from the coil about 50 microseconds after entering it. The returned light pulse components indicated at 18r, 20r are recombined at the beam splitter 17 for form a pair of light components that are incident on a light-detector apparatus 34.

The amount of light incident on the detector apparatus 34 depends upon the angle by which the two returned light components 18r, 20r are out of phase. The graph 36 in FIG. 2 shows how the light incident on the detector apparatus varies with the phase difference between the two returned light components 18r, 20r, with the intensity of the light being maximum at a 0° phase difference and being zero at a 180° phase difference. As is described in U.S. Pat. No. 4,280,766 by Goss et al., the bias cell 22 of FIG. 1 shifts the phase of a light component traveling in only one direction by 90°, so that at 0° rotation of the coil 28 the system works at the point 38 in the graph of FIG. 2, where there is the steepest change in light intensity with phase change. The modulator 24 of FIG. 1 can be operated to switch every other pulse component to enter different ends 26, 30 of the optic fiber coil.

The ability of the optic gyro to measure rotation with very great accuracy and to measure very small rates of rotation depends upon the ability of the detector 34 to measure the amount of incident light with high accuracy. The amount of light can be measured by detecting either the peak intensity of light, or the total amount of light received which is proportional to the total number of photons of light incident on the detector. Peak detection is undesireable because it is highly suseptible to noise, with a very brief but high noise level resulting in an erroneously high light measurement. The integration of the received light enables the averaging out of noise that sometimes increases and sometimes decreases the light level.

FIG. 3 includes a graph 40 which indicates the variation in light intensity with time of a laser light pulse that is transmitted by the laser 16 of FIG. 1. In the example illustrated in FIG. 3, the laser pulse lasts for 10 microseconds. Another graph 42 illustrates the variation in intensity of light reaching the detector 34 of FIG. 1. During a first period indicated at 44 of the graph 42, light reflections from optical components of the system, such as the bias cell 22 and the modulator 24 add considerable light input to the detector. Thereafter, backscatter from the optical fiber of the coil 28 produces light, indicated at 46, that reaches the detector, with the intensity of the backscatter decreasing exponentially. About fifty microseconds after the transmission of the pulse, a returned pulse shown at 48, consisting of the light pulse components 18r, 20r, is received by the detector. The intensity of the returned pulse may be on the order of 10% of the intensity of the transmitted pulse, and the total returned light (in number of photons) is much less than the spurious signal resulting from reflections from optical elements represented at 44 and from backscatter represented at 46.

One type of apparatus that could be used to detect the returned pulse 48 while rejecting optic element reflections and backscatter, is a photodetector of the silicon or germanium type, and a circuit which turns on such a photodetector immediately before fifty microseconds have elapsed after the transmission of the laser pulse. However, substantial amounts of noise are created in the turning on of silicon and germanium photo diodes, which results in the creation of considerable amounts of electrical noise and adds to the current representing the returned pulse. A CCD (charge coupled device) could be readily used to detect the returned pulse, except that such a device cannot be turned on and off. In a CCD, a charge accumulates so long as light falls on the device, and the amount of light is typically determined by transferring out the charge.

In accordance with the present invention, a CCD (charge coupled device) is used to detect the total light in the returned pulse indicated at 48 in FIG. 3, while eliminating the effects of reflections from optical elements and backscatter. This is accomplished by transferring out the charge accumulating in the CCD prior to the time when the returned pulse indicated at 48 is expected to be received, and dumping the charge as by connecting it to a ground. Just prior to the time of arrival of the returned pulse, the charge is allowed to accumulate and the total charge accumulated by the CCD is measured and converted into a signal that represents the integrated amount of light received by the CCD during the period of the returned pulse. No appreciable noise is created at the beginning or end of a transfer.

FIG. 5 illustrates some details of a light detector 34 of the detector apparatus, upon which a light beam 50 falls, which represent the interfering light pulse components 18r, 20r. The detector 34 must measure the integrated light which represents the number of photons falling on the detector. The detector includes four CCD pixels labelled A, B, C, and D upon which the light beam 50 actually falls. The light beam creates charges in these pixels. At the end of the returned pulse, or at intervals during receipt of the returned pulse, signals from a transfer means 37 which is coupled to all of the pixels, transfers the charges downwardly, as from pixel A to pixel B to the pixel 52, and from pixel C to pixel D to pixel 54. The charge in pixel 52 is then transferred to pixel 54, and all the charge in pixel 54 is transferred from there to a storing pixel 56.

After all charges have been transferred to pixel 56, at the end of the returned light pulse, the total charge in the pixel 56 can be measured by a detect circuit means 53. The pixel 56 is connected to an input 55 formed by the gate 57 of an output FET (field effect transistor) 58. The FET 58 serves as a means for generating a signal representing the amount of charge received at the input 55. A gate capacitance, indicated in phantom lines at 59, of the FET, converts the charge into a buffered voltage. The voltage across the phantom capacitance 59, which controls current flowing through the output FET, results in a voltage across an output resister 60 which is proportional to current through the transister, and which is amplified by an amplifier 61. At the end of the light pulse, a gating pulse is delivered over a ine 62 to the amplifier 61, so that the amplified signal is delivered to an analog-to-digital converter 63, whose output 79 represents the charge in the pixel 56 and therefore the integrated total light falling on the light detector.

During the period such as 50 microseconds, when reflections from optical elements and other noise is being received by the CCD, a reset FET transistor 64 keeps the gate 57 of the output FET at a constant voltage V such as 10 volts. The reset FET acts as a dump means for disposing of preliminary charges from the CCDs. The constant voltage at the gate 57 prevents any change in the electrical charge in the capacitance 62, which has a capacitance such as 0.28 picofarads, to thereby dump the charge by disposing of it through the reset FET. Where the voltage V on the drains 65, 66 of the FET's is 10 volts, this can be accomplished by a control or operating means 68 that applies 10 volts to the gate 67 of the reset FET, so that there is a constant voltage of 10 volts on the gate 57 of the output FET. At the time such as 50 microseconds, when the beginning of the returned light pulse is expected, the voltage at 67 can be dropped to zero. Then, the charge building up in the CCD 56 results in the voltage on the output gate 57 repeatedly decreasing from 10 volts to some lower level. At the end of the returned pulse, which may occur 60 microseconds after the beginning of a cycle, the output 79 is measured. Then the control 68 returns the gate 67 of the reset transistor to 10 volts to again dump all charges from the CCD 56. In this system the control or operating means 68 operates the reset FET to dump (and continue to dump) charges within a microsecond of the expected time of arrival of the light pulse component. In any system, the operating means should dump the charge within a milisecond of the expected arrival of a light pulse in order to avoid noise-caused charge buildup, and preferable transfer out and dump the charge a plurality of times within a milisecond of the arrival of a light pulse.

It would be possible to dump the charges in the pixels of the light detector 35 only once immediately prior to the return of the transmitted light pulse. However, such a single dumping, or transfer out, would be undesirable, because large charges would build up in the CCD pixels A, B, C, and D. If an excessive charge builds up in a CCD, it "blooms", that is, the charge overflows into adjacent pixels. By transferring out and dumping the charges repeatedly prior to the receipt of the returned light pulse, applicant is able to use small CCD pixels, without danger of blooming. A repeated transfer out of charge during the duration of the returned light pulse, also avoids the danger of blooming. The detection pixels A–D are made small to minimize noise, but the final pixel 56 is made large to accumulate appreciable charge without blooming during the period such as 10 microseconds of the returned pulse. No appreciable noise is created by the beginning or end of charge dumping.

During a preliminary period after the beginning of transmission of the laser pulse (at time 0) and the time 74 (FIG. 4) when the returned pulse is expected, applicant repeatedly transfers out any charges in the CCD and dumps them. At the tim e74 when the returned pulse is expected, the transfer out of charge accumulating in the CCD occurs at less frequent intervals, and these transferred detect charges are accumulated. Although charges in a CCD can be transferred at a rate as high as about 10 megahertz, or about 10 times per microsecond, applicant can conservatively transfer out charges at a rate of 5 megahertz, so the transfers 76 occur at 0.2 microsecond intervals. After the time 74 when the returned pulse is expected, applicant slows the transfer out to a 1 megahertz rate, so that the transfer 78 occur at intervals of about 1 microsecond.

It is desireable to use a minimum number of pixels of minimum size. The smaller the pixel, the smaller the noise that is self generated within the pixel. Also, it is preferable to minimize the number of transfer of charge, since there is an incomplete transfer of charge at every transfer, even though the incompleteness is very samll such as about 0.003%. The portion of a light detector which receives light, such as the four pixels A, B, C, D, preferably includes no more than four pixels. Such a light detector portion of small size can be used where the light carrier is a waveguide, since an optical fiber is typically about 6 to 9 microns diameter. A light detector portion of no more than four CCD pixels having a total width and length no greater than one order of magnitude larger than the diameter of the fiber, or in other words no greater than about 80 microns wide and 80 microns long, is desireable. It is desireable to use a small pixel of a width and length less than 35 microns, such as of 20 microns width and length to capture all of the light exiting from the end of an optic fiber. FIG. 6 shows how a single CCD pixel 80 can be placed at the end of a miniature block 82 of silicon, which transfers light alaong the path indicated by arrow 84, from the end 86 of an optical waveguide 88 formed in a silicon chip to the CCD pixel. The pixel 80 can be connected to a pixel such as 56 in FIG. 5 to enable dumping and then accumulation of charge.

An optic gyroscope such as the type shown in FIG. 1 can be operated in a variety of ways to detect rotation. The simplest, but relatively inaccurate way, is to merely measure changes in the amount of light falling on the light detector 35, which indicates the change in phase of the two light components, and therefore rotation of the optic fiber coil. The laser 16 repeatedly generates light pulses at intervals such as at every hundred microseconds, and the modulator 24 can be used to switch the light components 18 and 20 so that alternate light components 18 travel respectively clockwise and counterclockwise around the coil, with the other component traveling in the opposite direction. Another detection scheme is to detect only second harmonics of the interfering returned light beam components, since the second harmonic increases according to the increase in phase difference between the two light components. In all of these techniques, the sensitivity and accuracy of the rotation measurement depends upon the accuracy of the measurement of the light detected by the CCD device. It should be understood that the CCD detector of the invention can be used to detect light pulse components in other applications, such as in ranging where the time required for the return of a transmitted signal is to be determined as by comparing the returned pulse with a pulse that passes through a waveguide of known distance, and where most of the light returned to the detector is light reflected from optical elements and other extraneous sources.

Thus, the invention provides a method and apparatus for detecting a light pulse with great accuracy, and for avoiding errors resulting from light received immediately prior to detection of the desired light pulse. This can be accomplished by the use of a CCD device to detect the desired light, by transferring out and dumping accumulated charge in the CCD prior to the receipt of the desired light to be detected. Such transference out of charge can be performed repeatedly prior to the time of detection of the desired light, to prevent the excessive buildup of charges in a CCD pixel.

Although particular embodiments of the invention have been described and illustrated herein, it is recognized that modifications and variations may readily occur to those skilled in the art and consequently, it is intended that the claims be interpreted to cover such modifications and equivalents.

What is claimed is:

1. A sensor for detecting the difference in phase of a pair of returned light pulse components that are portions of a transmitted light pulse which passes through optical elements that can produce backscatter, by measuring the intensity of the interfering returned components, comprising:

a light detector which includes at least one CCD positioned to receive returned pulse components and to generate a charge proportional to the received light of the returned pulse coponents;

detect circuit means having an input coupled to said CCD for generating an output signal representing the amount of charge received at said input, said detect circuit means including means coupled to said CCD for transferring a preliminary charge from said CCD to said input at least once during a preliminary period between transmittal of the transmitted light pulse and receipt of said components and for later transferring a later charge from said CCD to said input after receipt of at least part of said components at said CCD, and said detect circuit means having means coupled to said input for dumping the transferred out preliminary charge, said detect circuit means including means for generating an output signal representing the amount of charge received at said input at a time after receipt of said returned light components, whereby to minimize the effect on the output signal of any reflections and backscatter from optical elements.

2. The apparatus described in claim 1 wherein: said optical elements include an optical waveguide having a predetermined diameter, and said light detector includes a light detector portion which receives light, which is formed of no more than four CCDs positioned to intercept the returned components, said light detector portion having a width and length that are each of the same order of magnitude as said predetermined diameter.

3. A method for detecting the difference in phase of a pair of returned light pulse components that are portions of a transmitted light pulse, which pass through optical elements, by measuring the intensity of the interfering returned components, comprising:
directing said light pulse components onto a detect CCD;
transferring out the charge stored in said detect CCD to a storage CCD a plurality of times during a period beginning after the transmission of the transmitted light pulse but prior to receipt of either of said light pulse components, and dumping the transferred out charge from said storage CCD;
transferring out the charge stored in said detect CCD to said storage CCD at a time after the receipt of said light pulse components and generating a signal representing the amount of charge transferred out to said storage CCD after the receipt of said components.

4. Apparatus for detecting a light pulse that is expected to be received at a predetermined time, comprising:
at least a first CCD positioned to receive said light pulse and generate an electric charge;
a storing CCD coupled to said first CCD to receive a charge therefrom;
an output transistor having a gate input terminal connected to said storing CCD and having a pair of output terminals;
circuit means connected to said output terminals of said output transistor for generating a signal representing a signal received by said output transistor gate input terminal;
a reset transistor which is connected to the gate of said output transistor, and means for operating said reset transistor in a first mode to maintain a predetermined constant voltage at the gate of the output transistor to thereby dump the charge in said storing CCD, and in a second mode to permit the voltage at the gate of the output transistor to change from said predetermined voltage by an amount dependent on the charge in said storing CCD; and
means for transferring the charge in said first CCD to said storing CCD a plurality of times prior to the expected time of receipt of the light pulse, and for maintaining said reset transistor in said first mode prior to the expected time of receipt of the light pulse, and then operating said reset transistor in said second mode after said expected time of arrival.

5. In an optical gyroscope which includes means for generating a light pulse, splitting the light pulse into two light components, passing the two light components in opposite directions through a coil of optical fiber, and directing the two components emerging from the coiil of optical fiber onto a photodetector device to sense the phase difference of the components, the improvement wherein:
said light pulse has a duration which is less than the time required for light to pass through said coil;
said photodetector device includes means for detecting light during a period about equal to the duration of said light pulse, and which begins at about the expected time of arrival of said light components after they have traversed said coil of optical fiber, said detecting means beginning said period at a time after the trailing edge of said light pulse components have entered said coil, to allow the dissipation of reflections from optical components through which light passes prior to entering the coil before detecting the light.

6. In an optical gyroscope which includes means for generating a light pulse, means for splitting the light pulse into two light components, passing the two light components in opposite directions through a coil of optical fiber, and directing the two components emerging from the coil of optical fiber onto a photodetector device to sense the phase difference of the components, the improvement wherein:
said coil has a length which is long enough that it requires a plurality of microseconds for light to pass through it;
said light pulse has a duration which is less than the time required for light to pass through said coil, but which is at least one microsecond, whereby to ennable an accurate determination of the period between the leading and trailing edges of said light components;
said photodetector device comprises a charge coupled device for detecting the integral of light with time, and includes means for detecting light during a period about equal to the duration of said light pulse, and which begins at about the expected time of arrival of said light components after they have traversed said coil of optical fiber.

* * * * *